United States Patent
Imai (10) Patent No.: US 9,067,440 B2
(45) Date of Patent: *Jun. 30, 2015

(54) INFORMATION PROCESSING METHOD, PRINTING APPARATUS, AND COMPUTER-READABLE MEDIUM FOR SUPRESSING LIGHT SCATTERING

(71) Applicant: Canon Kabushiki Kaisha, Tokyo (JP)

(72) Inventor: Ayato Imai, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/657,436

(22) Filed: Oct. 22, 2012

(65) Prior Publication Data

US 2013/0038653 A1 Feb. 14, 2013

Related U.S. Application Data

(63) Continuation of application No. 12/402,250, filed on Mar. 11, 2009, now Pat. No. 8,310,702.

(30) Foreign Application Priority Data

Mar. 17, 2008 (JP) ................................ 2008-068352

(51) Int. Cl.
  *B41J 19/14* (2006.01)
(52) U.S. Cl.
  CPC ..................................... *B41J 19/147* (2013.01)
(58) Field of Classification Search
  None
  See application file for complete search history.

(56) References Cited

U.S. PATENT DOCUMENTS

| 3,962,397 | A | 6/1976 | Narui et al. | |
| 4,139,853 | A * | 2/1979 | Ghekiere et al. | 430/290 |
| 6,033,055 | A | 3/2000 | Nagoshi et al. | |
| 6,997,542 | B2 | 2/2006 | Takenaka | |
| 7,128,394 | B2 | 10/2006 | Takenaka | |
| 7,290,854 | B2 | 11/2007 | Mizutani et al. | |
| 7,306,311 | B2 | 12/2007 | Yamanobe | |
| 7,643,776 | B2 | 1/2010 | Walton et al. | |
| 8,310,702 | B2 * | 11/2012 | Imai | 358/1.15 |
| 2004/0009294 | A1 | 1/2004 | Kuribayashi et al. | |
| 2004/0252160 | A1 | 12/2004 | Iwasaki et al. | |
| 2006/0203061 | A1 * | 9/2006 | Ichinose et al. | 347/100 |
| 2007/0230819 | A1 * | 10/2007 | Shimizu | 382/275 |
| 2007/0291076 | A1 | 12/2007 | Seki et al. | |

FOREIGN PATENT DOCUMENTS

JP 6-171111 A 6/1994
JP 2004-155181 A 6/1994

(Continued)

*Primary Examiner* — Justin Seo
(74) *Attorney, Agent, or Firm* — Fitzpatrick, Cella, Harper & Scinto (57) ABSTRACT

An information processing apparatus for generating print data for a printing apparatus that forms an image on a printing medium with a plurality of types of printing materials. An acquisition unit acquires light scattering characteristic information representing a light scattering characteristic of each of the plurality of types of printing materials. A decision unit decides an order of superposing the plurality of types of printing materials in a predetermined region of the image in accordance with the acquired light scattering characteristic information such that a printing material having a relatively high light scattering characteristic is printed on a relatively lower layer on the printing medium. A generation unit generates the print data to form the image on the printing medium using the plurality of types of printing materials in accordance with the decided order.

8 Claims, 8 Drawing Sheets

(56) References Cited

FOREIGN PATENT DOCUMENTS

| | | |
|---|---|---|
| JP | 2003-54016 A | 2/2003 |
| JP | 2005-186610 A | 7/2005 |
| JP | 2005-193463 A | 7/2005 |
| JP | 2005-246651 A | 9/2005 |
| JP | 2006-224535 A | 8/2006 |
| JP | 2007-331308 A | 12/2007 |

* cited by examiner

|  | FIRST PASS | SECOND PASS | THIRD PASS | FOURTH PASS |
| --- | --- | --- | --- | --- |
| GROUP 1 | 10% | 20% | 30% | 40% |
| GROUP 2 | 10% | 40% | 40% | 10% |
| GROUP 3 | 40% | 30% | 20% | 10% |

FIG. 7

INFORMATION PROCESSING METHOD, PRINTING APPARATUS, AND COMPUTER-READABLE MEDIUM FOR SUPRESSING LIGHT SCATTERING

RELATED APPLICATIONS

This application is a continuation of application Ser. No. 12/402,250, filed Mar. 11, 2009. It claims benefit of that application under 35 U.S.C. §120, and claims benefit under 35 U.S.C. §119 of Japanese Patent Application No. 2008-068352, filed on Mar. 17, 2008. The entire contents of each of the mentioned prior applications are incorporated herein by reference.

BACKGROUND OF THE INVENTION

1. Field of the Invention

The present invention relates to an information processing method, printing apparatus, and computer-readable medium for generating print data in a printing apparatus which forms an image on a printing medium with a plurality of types of printing materials.

2. Description of the Related Art

Recently, various types of printing apparatuses have been proposed as information output apparatuses for a word processor, personal computer, facsimile apparatus, and the like. The printing apparatus prints desired information such as text and images on a sheet-like printing medium such as paper or a film. Of these printing apparatuses, a printing apparatus which forms text and images on a printing medium by applying a printing material to the printing medium has become commercially available. A typical example of this printing apparatus is an inkjet printing apparatus. These days, the performance of inkjet printing apparatuses has been improved to print not only text but also color images.

As the image quality of color inkjet printing apparatuses has improved, so-called photo printing has become popular for outputting digital images using the color inkjet printing apparatuses. As photo printing has prevailed, preservation of printouts becomes important.

Conventionally, dye ink has been mainly used as a printing material in the inkjet printing apparatus. However, the preservation properties of dye ink are poor, so the color inkjet printing apparatus sometimes uses pigment ink, which are known to have excellent preservation properties.

Some of the above-described inkjet printing apparatuses use a plurality of types of inks, and reproduce multi-color, multi-tone images by forming a plurality of types of ink dots on top of each other on a printing medium, as disclosed in Japanese Patent Laid-Open Nos. 2003-54016 and 6-171111.

When the color is reproduced by discharging ink onto a printing medium, the reproduced color and glossiness sometimes change depending on the order in which a plurality of types of inks are superposed. As the color reproduction range is wider (colors in a wider range can be reproduced), a higher image quality can be achieved. According to a technique disclosed in Japanese Patent Laid-Open No. 2004-155181, color reproduction ranges when superposing inks in all orders are measured in advance, and the ink discharge order is controlled in accordance with the measurement results.

Japanese Patent Laid-Open No. 2005-193463 discloses a technique of suppressing a decrease in glossiness by printing with inks in an order in which an ink other than one having the highest density or an ink other than one having the lowest glossiness is superposed finally.

In practice, however, no conventional technique has made a close examination of the relationship between a concrete ink superposition order and the color reproduction range.

According to a method of measuring color gamuts by printing in all color orders in advance, as disclosed in Japanese Patent Laid-Open No. 2004-155181, the number of processes abruptly increases as the number of colors used, the number of printing media, and the number of print modes increase. Hence, this method is not practical in multi-color printers.

SUMMARY OF THE INVENTION

The present invention has been made to overcome the conventional drawbacks, and provides an information processing method, printing apparatus, and computer-readable medium capable of suppressing scattering of light in an unnecessary wavelength band to the outside, and widening the color reproduction range of high-saturation, high-density portions.

According to the first aspect of the present invention, there is provided an information processing method of generating print data in a printing apparatus which forms an image on a printing medium with a plurality of types of printing materials, the method comprising: a generating step of generating print data to form an image on the printing medium by superposing the plurality of types of printing materials in at least some pixels of an output image in an order complying with intensities of light scattering characteristics of the plurality of types of printing materials; and a transmission step of transmitting the print data generated in the generating step to the printing apparatus.

According to the second aspect of the present invention, there is provided an information processing method of generating print data in a printing apparatus which forms an image on a printing medium with a plurality of types of printing materials, the method comprising: an acquisition step of acquiring light scattering characteristic information of all printing materials used in the printing apparatus; a decision step of deciding, in accordance with the light scattering characteristic information acquired in the acquisition step, an order in which the plurality of types of printing materials are superposed in at least some pixels of an output image to form an image on the printing medium; and a generation step of generating print data to form an image on the printing medium by superposing the plurality of types of printing materials in the order decided in the decision step.

According to the third aspect of the present invention, there is provided a printing apparatus that forms an image on a printing medium with a plurality of types of printing materials, the printing apparatus comprising: a generating unit configured to generate print data for forming an image on the printing medium by superposing the plurality of types of printing materials in at least some pixels of an output image in an order complying with intensities of light scattering characteristics of the plurality of types of printing materials; and a printing unit configured to print based on the print data.

According to the fourth aspect of the present invention, there is provided a printing apparatus that forms an image on a printing medium with a plurality of types of printing materials, the printing apparatus comprising: an acquisition unit configured to acquire light scattering characteristic information of all printing materials used in the printing apparatus; a decision unit configured to decide, in accordance with the light scattering characteristic information acquired by the acquisition unit, an order in which the plurality of types of printing materials are superposed in at least some pixels of an output image to form an image on the printing medium; a generation unit configured to generate print data for forming an image on the printing medium by superposing the plurality of types of printing materials in the order decided by the decision unit; and a printing unit configured to print based on the print data.

According to the fifth aspect of the present invention, there is provided a computer-readable medium for storing a program which causes a computer to execute information processing of generating print data in a printing apparatus which forms an image on a printing medium with a plurality of types of printing materials, the program causing the computer to execute a generating step of generating print data to form an image on the printing medium by superposing the plurality of types of printing materials in at least some pixels of an output image in an order complying with intensities of light scattering characteristics of the plurality of types of printing materials, and a transmission step of transmitting the print data generated in the generating step to the printing apparatus.

According to the sixth aspect of the present invention, there is provided a computer-readable medium for storing a program which causes a computer to execute information processing of generating print data in a printing apparatus which forms an image on a printing medium with a plurality of types of printing materials, the program causing the computer to execute an acquisition step of acquiring light scattering characteristic information of all printing materials used in the printing apparatus, a decision step of deciding, in accordance with the light scattering characteristic information acquired in the acquisition step, an order in which the plurality of types of printing materials are superposed in at least some pixels of an output image to form an image on the printing medium, and a generation step of generating print data to form an image on the printing medium by superposing the plurality of types of printing materials in the order decided in the decision step.

According the seventh aspect of the present invention, there is provided a printing apparatus which forms an image on a printing medium with a plurality of types of printing materials, the apparatus comprising: a printhead having a plurality of nozzle arrays for discharging the plurality of types of printing materials; and a main-scanning drive unit configured to execute main scanning by driving at least either of the printhead and a printing medium, wherein at least some of the nozzle arrays of the printhead are aligned in order in a traveling direction of main scanning of the printhead in accordance with an order in which printing materials discharged from the nozzle arrays are superposed, and the order in which the printing materials are superposed complies with light scattering characteristic information.

Further features of the present invention will be apparent from the following description of exemplary embodiments with reference to the attached drawings.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

<First Embodiment>
[Outline of Printing System]

Figure 1A:
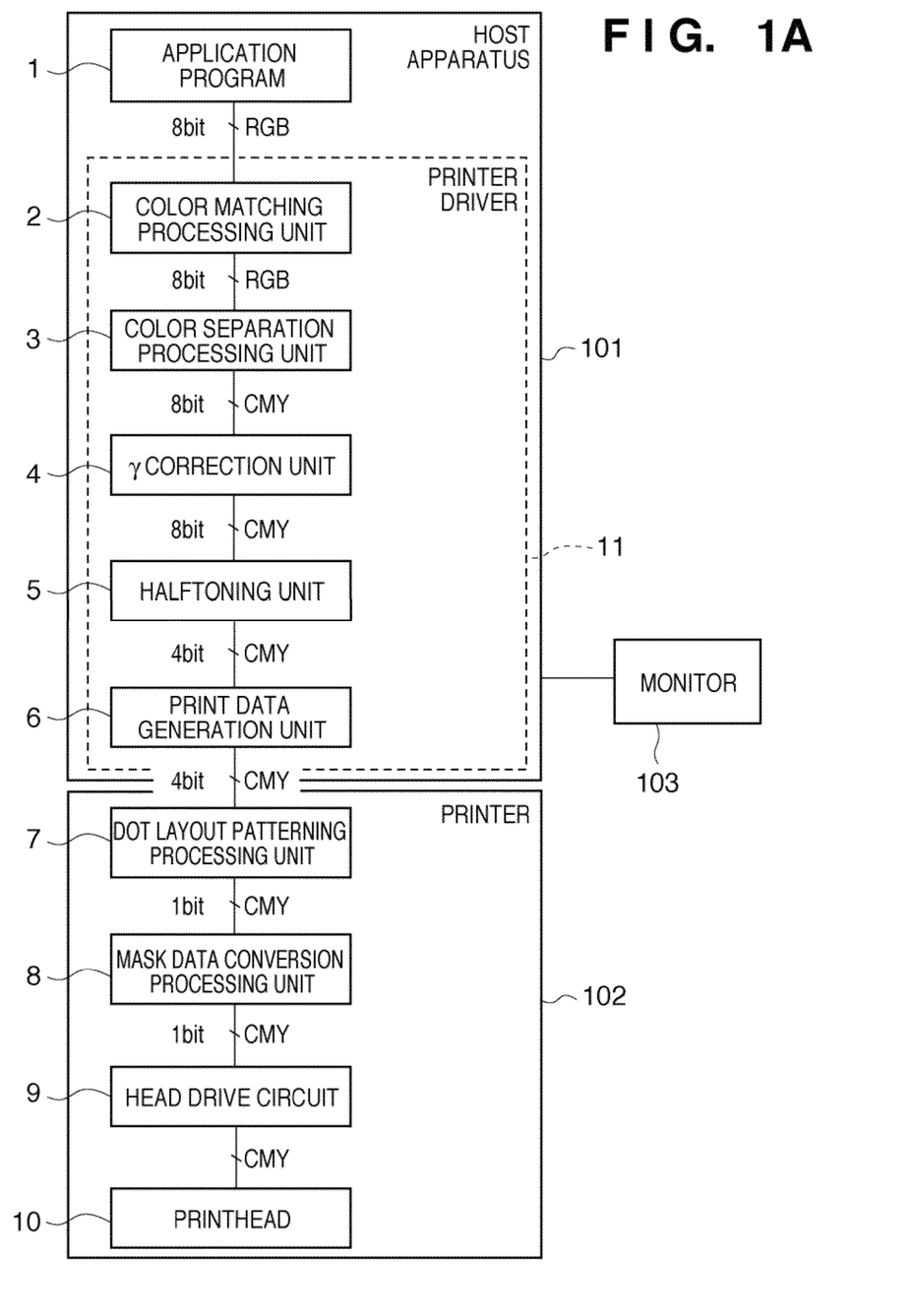
FIG. 1A is a block diagram showing an example of the configuration of a printing system according to the first embodiment of the present invention.

FIG. 1A is a block diagram showing an example of the configuration of a printing system according to the first embodiment of the present invention.

The printing system includes an inkjet printer (printing apparatus) 102, and a host apparatus (computer or information processing apparatus (image processing apparatus)) 101.

The inkjet printer (to be simply referred to as a printer hereinafter) 102 prints with three pigment inks cyan C, magenta M, and yellow Y (a plurality of types of printing materials). For this purpose, the printer 102 uses a printhead 10 for discharging these three color inks The printhead 10 has a plurality of nozzle arrays for discharging a plurality of types of printing materials to the entire width of a printing region in one direction on a printing medium.

The printer 102 includes a main-scanning drive unit which executes main scanning by driving at least either the printhead 10 or a printing medium. Depending on the configuration, the printer 102 includes a sub-scanning drive unit which performs sub-scanning by driving at least either the printhead 10 or a printing medium each time main scanning ends. These drive units are implemented by a head drive circuit 9.

An application program 1 and printer driver 11 run on the operating system (OS) of the host apparatus 101. The application program 1 creates and edits image data to be printed by the printer 102.

Image data or image data before editing can be input to the host apparatus 101 via a variety of media. For example, JPEG image data obtained by a digital camera may also be input via a memory card. TIFF image data scanned by a scanner or image data recorded on a CD-ROM may also be input. Needless to say, image data may also be downloaded from a server or Web site on a network such as the Internet.

The host apparatus 101 displays input image data on a monitor 103. The user of the host apparatus 101 edits and processes image data via an operation window that is generated by the application program 1 and displayed on the monitor 103, and he designates printing. In accordance with this designation, the application program 1 (or OS) converts the image data into sRGB image data (8 bits for each color), and outputs the sRGB image data to the printer driver 11.

The printer driver 11 executes color gamut mapping for image data input from a color matching processing unit 2. The color matching processing unit 2 converts RGB data into RGB data in a printer color gamut by interpolation using a three-dimensional LUT (3D LUT) representing the relationship between a color gamut reproduced by sRGB image data and a color gamut (printer color gamut) reproducible by the printer 102.

A color separation processing unit 3 generates color separation data C, M, and Y (8 bits for each color) corresponding to a combination of inks which reproduce a color represented by RGB data mapped in the color gamut. Similar to processing by the color matching processing unit 2, the color separation processing unit 3 executes this processing by interpolation using a 3D LUT.

A gamma (γ) correction unit 4 performs gamma correction to convert the tone value of each color data of color separation data C, M, and Y obtained by the color separation processing unit 3. More specifically, the γ correction unit 4 converts the color separation data C, M, and Y to make them correspond to the tone characteristics of the printer 102 by using a one-dimensional LUT (1D LUT) corresponding to the tone characteristics of respective color inks in the printer 102.

A halftoning unit 5 quantizes each of the color separation data C, M, and Y (8 bits for each color) into 4-bit data by using, for example, error diffusion. The 4-bit data serves as an index representing a dot layout pattern in the printer 102.

A print data generation unit 6 generates print data by adding print control information to 4-bit index data.

The hardware configuration of the host apparatus 101 will be explained with reference to FIG. 1B.

Figure 1B:
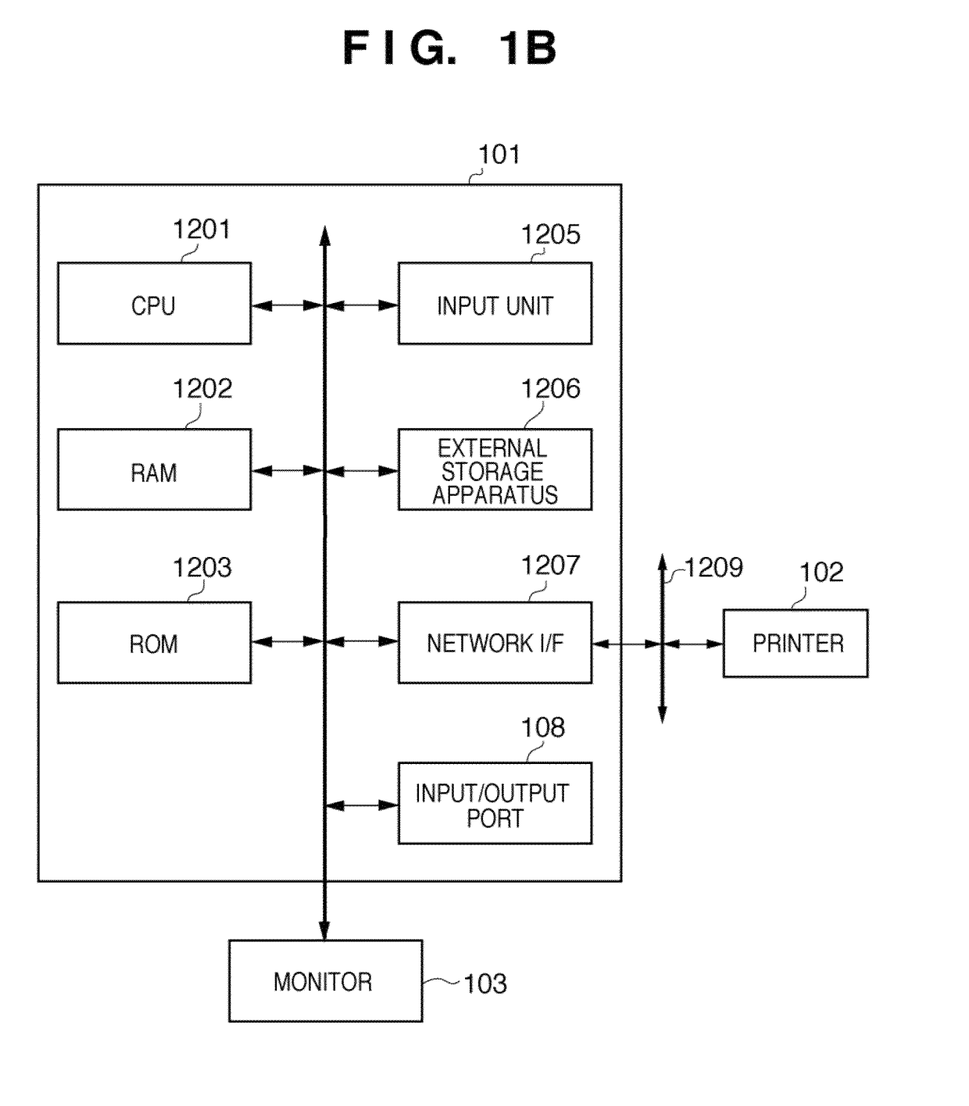
FIG. 1B is a block diagram showing the hardware configuration of a host apparatus according to the first embodiment of the present invention.

FIG. 1B is a block diagram showing the hardware configuration of the host apparatus according to the first embodiment of the present invention.

In FIG. 1B, a CPU 1201 controls the operation of the overall host apparatus 101 in accordance with programs stored in a RAM 1202 and ROM 1203. The RAM 1202 is used as the main memory of the CPU 1201, and a program to be executed by the CPU 1201 is loaded into the RAM 1202. The RAM 1202 provides a work area for temporarily saving various data in a control operation by the CPU 1201. The ROM 1203 stores a boot program and various data in a nonvolatile way.

The monitor 103 includes a display unit such as a CRT or liquid crystal display, and is used to display data to be processed and a UI window to be described later. An input unit 1205 includes pointing devices such as a keyboard and mouse, and is used to input various data and commands by a user operation.

An external storage apparatus 1206 is a large-capacity storage apparatus such as a hard disk. An OS, the application program 1, the printer driver 11, data, and the like are installed in advance in the external storage apparatus 1206. When activation of a program is designated, the program is loaded into the RAM 1202 and executed.

A network interface (I/F) 1207 controls an interface with a network 1209 such as a LAN. The printer 102 and a variety of input/output devices are connected to the network 1209. An input/output port 1208 is an interface such as a USB or IEEE1394 interface.

Processes (information processing method) by the above-mentioned application program 1 and printer driver 11 are achieved by executing the programs of the processes by the CPU 1201. The programs are loaded from the ROM 1203 or external storage apparatus 1206 into the RAM 1202, and executed. When executing the programs, the RAM 1202 is used as the work area of the CPU 1201.

In the printer 102, a dot layout patterning processing unit 7 and mask data conversion processing unit 8 process print data input from the host apparatus 101.

The dot layout patterning processing unit 7 lays out dots in accordance with a dot layout pattern corresponding to 4-bit index data (tone value information) for each pixel of an actual print image. More specifically, the dot layout patterning processing unit 7 assigns a dot layout pattern corresponding to the tone value of a pixel to each pixel expressed by 4-bit data. The dot layout patterning processing unit 7 defines the dot ON/OFF state of each of areas in each pixel, and arranges 1-bit discharge data "1" or "0" for each area.

The mask data conversion processing unit 8 executes mask processing for 1-bit discharge data. More specifically, the mask data conversion processing unit 8 executes processing using a mask corresponding to each scanning to generate discharge data of each scanning for completing printing by the printhead 10 by a plurality of number of scanning operations in a scanning region (to be referred to as a "band" hereinafter) of a predetermined width in the sub-scanning direction.

Details of the mask data conversion processing unit 8 will be described later. The printhead 10 is formed by arraying, in the main scanning direction, a plurality of printing elements for discharging, for example, C, M, and Y color inks The sub-scanning direction is a direction perpendicular to the main scanning direction which is a printing medium conveyance direction.

Discharge data (discharge data C, M, and for respective colors) generated for each scanning by the mask data conversion processing unit 8 are transmitted to the head drive circuit 9 at an appropriate timing. The head drive circuit 9 drives the printhead 10 to discharge each ink in accordance with the discharge data.

The processes of the dot layout patterning processing unit 7 and mask data conversion processing unit 8 in the printer 102 are executed under the control of a CPU which forms the control unit of the printer 102 using a dedicated hardware circuit. The CPU of the printer 102 may also perform these processes in accordance with programs, or for example, the printer driver 11 of the host apparatus 101 may also perform them.

The host apparatus 101 which executes processes shown in FIG. 1 is not limited to a computer. For example, the printer 102 may also execute the processes of the host apparatus 101.

In the first embodiment, a "pixel" is a minimum unit capable of expressing a tone, and also a minimum unit to undergo multilevel data image processing, and processes of the color matching processing unit 2, color separation processing unit 3, γ correction unit 4, halftoning unit 5, and the like. One pixel in the dot layout patterning processing unit 7 corresponds a pattern of 4×4 squares, and each square in one pixel will be called an area. The area is a minimum unit capable of defining the dot ON/OFF state.

In association with this, "image data" in the color matching processing unit 2, color separation processing unit 3, and γ correction unit 4 means a set of pixels to be processed, and each pixel is data whose contents are, for example, an 8-bit tone value. "Pixel data" in the halftoning unit 5 means pixel data itself to be processed. The halftoning unit 5 converts the 8-bit pixel data into pixel data (index data) whose contents are a 4-bit tone value.

[Printer Driver UI]

An example of a printer driver UI (User Interface) for controlling the printer driver 11 in FIG. 1 according to the first embodiment will be explained with reference to FIG. 2.

Figure 2:
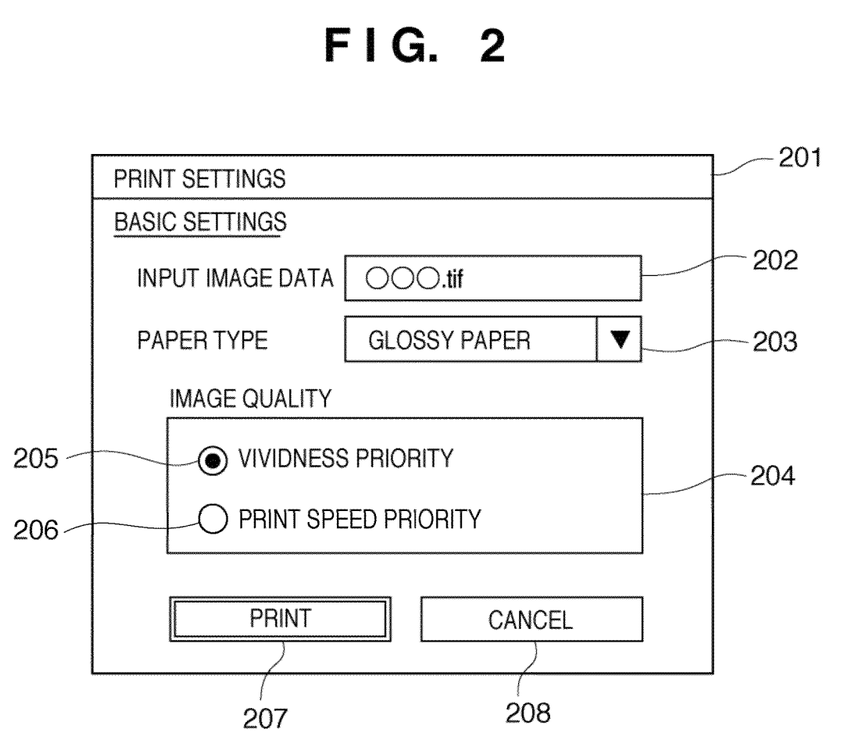
FIG. 2 is a view showing a print setup window serving as a printer driver UI according to the first embodiment of the present invention.

FIG. 2 is a view showing a print setup window serving as a printer driver UI according to the first embodiment of the present invention.

An input text box 202 is a control box for designating/inputting desired image data to be printed. Information such as the file name of image data is input to the input text box 202. A combo box 203 is a control box for selecting a printing medium used to print. The combo box 203 allows the user to select an arbitrary printing medium from all types of printing media available in the printer 102.

A group box 204 is a control box for alternatively selecting a radio button 205 or 206. The group box 204 has a function of allowing the user to select only either the radio button 205 or 206.

The radio button 205 is used to select a mode which gives priority to vividness (color reproduction range). When the radio button 205 is selected (checked), the print data generation unit 6 adds, to print data, print control information for controlling the superposition order of color inks The radio button 206 is used to select a mode which gives priority to the print speed. When the radio button 206 is selected (checked), the print data generation unit 6 adds, to print data, print control information for shortening the print time without controlling the superposition order of color inks That is, the radio buttons 205 and 206 function as control buttons for determining whether to execute color ink superposition order control processing.

A print button 207 is a control button for setting, as print conditions, various settings made in a print setup window 201, storing them in the RAM 1202, and designating execution of printing on the basis of the print conditions. More specifically, the print button 207 is used to transmit, to the printer driver 11, image data and print conditions associated with color ink superposition order control. A cancel button 208 is a control button for canceling various settings in the print setup window 201.

Various control boxes and buttons such as the text box, combo box, radio button, and group box in the print setup window 201 are merely examples. Other objects can also be employed as long as they have the same functions.

[Mask Data Conversion Processing]

FIGS. 3A to 3D are schematic views for explaining multipass printing according to the first embodiment of the present invention.

Multipass printing is generally applied to serial inkjet printers. Multipass printing forms an image step by step by a plurality of print scanning operations in a single image region on a printing medium.

Figure 3A:
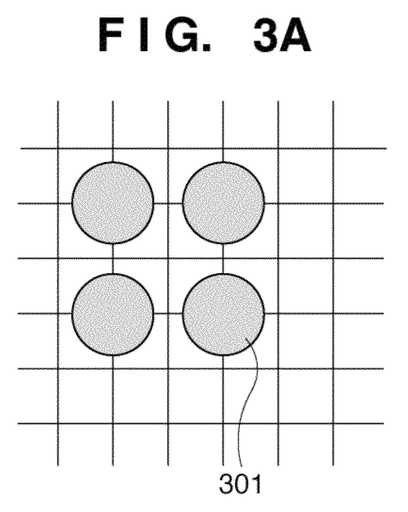
FIGS. 3A to 3D are schematic views for explaining multi-pass printing according to the first embodiment of the present invention.
Figure 3B:
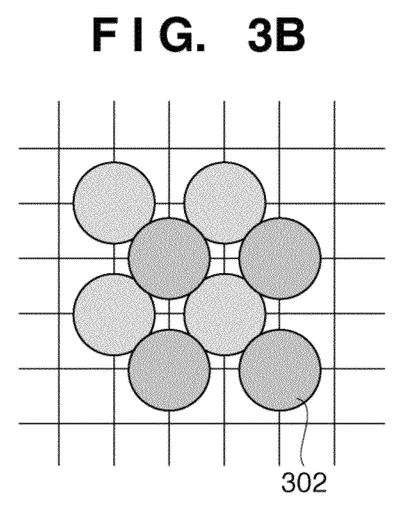
Figure 3C:
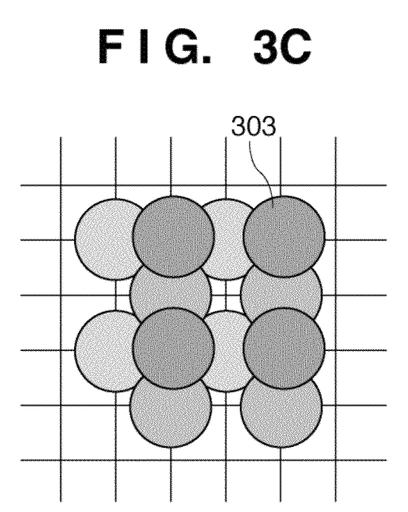
Figure 3D:
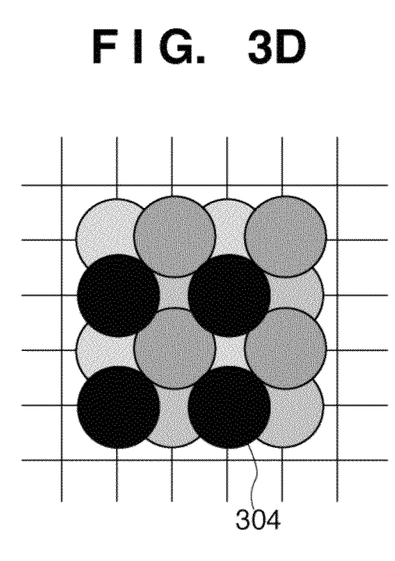

FIG. 3A shows the state of a printing medium after the first print scanning is done. Dots 301 are landed by the first print scanning In this example, the dots 301 are printed without overlapping each other. FIG. 3B shows the state of the printing medium after the second print scanning is done. Dots 302 are printed by the second print scanning FIG. 3C shows the state of the printing medium after the third print scanning is done. FIG. 3D shows the state of the printing medium after the fourth print scanning is done. Dots 303 and 304 are landed by the third and fourth print scanning operations.

Printing in a single image region is completed by four print scanning operations. An area printable by each print scanning is decided by, for example, ANDing print data and binary data called a mask pattern.

Multipass printing for completing printing in a single image region by n print scanning operations will be defined as n-pass printing. Printing completed by four print scanning operations in a single image region is expressed as 4-pass printing.

In multipass printing, a printing medium is conveyed at an interval between print scanning operations, so ink droplets are applied to the printing medium at a predetermined time interval. Printing on even a printing medium whose pigment ink absorption speed is low, such as plain paper, can proceed while drying applied ink droplets little by little. Thus, a high-quality result can be obtained in terms of fixation.

Since a printing medium is conveyed at an interval between print scanning operations, printing elements on the printhead for printing in a single image region change between print scanning operations. Even if discharge varies between printing elements, the variations can be distributed to make them less conspicuous on an image.

At the boundary between print scanning operations, a white or black streak may appear owing to variations in conveyance amount. However, multipass printing can make even such a streak less conspicuous on an image.

Variations in discharge of each printing element and variations in conveyance amount are image degradation factors which are inevitably generated in accordance with the manufacturing process and precision. Hence, the above-described multipass printing is an important printing technique for maintaining the image quality, and is generally employed in a serial inkjet printer.

An example of a mask pattern when the mode in which the superposition order of color inks is controlled (mode which gives priority to vividness) is selected (when the radio button 205 of the print setup window 201 in FIG. 2 is selected) will be explained with reference to FIGS. 4A to 4C.

Figure 4A:
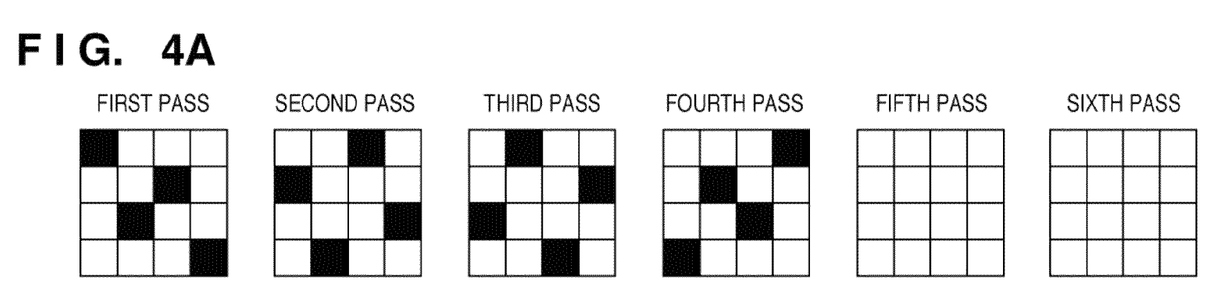
FIGS. 4A to 4C are views showing the mask patterns of respective colors used when a mode in which the superposition order of color inks is controlled is selected in 4-pass printing according to the first embodiment of the present invention.
Figure 4B:
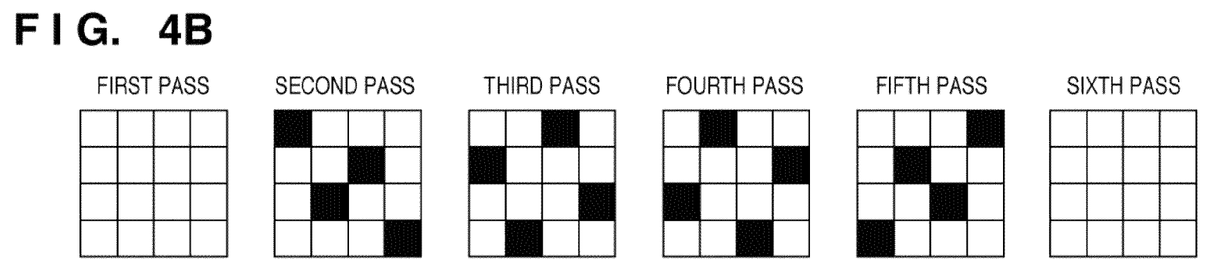
Figure 4C:
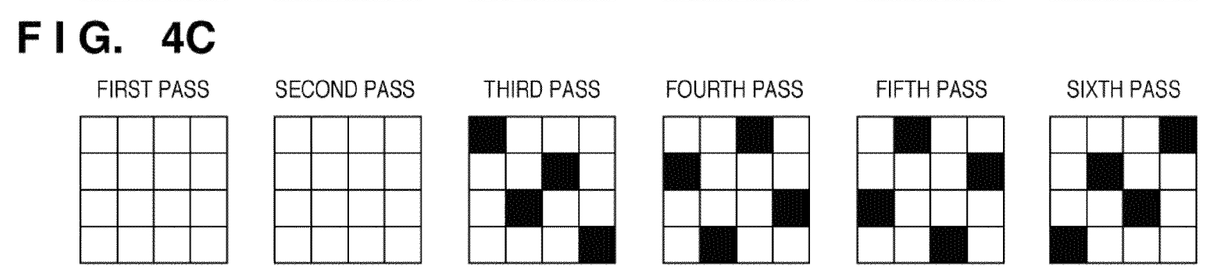

FIGS. 4A to 4C are views showing the mask patterns of respective colors used when the mode in which the superposition order of color inks is controlled is selected in 4-pass printing according to the first embodiment of the present invention.

In the first embodiment, the light scattering characteristic of each color ink is measured in advance to obtain the result that Y ink has the highest light scattering characteristic and M ink has the lowest light scattering characteristic.

The light scattering characteristic of each color ink may also be stored as light scattering characteristic information in the external storage apparatus 1206 of the host apparatus 101 or the internal memory of the printer 102. If necessary, the printer driver 11 of the host apparatus 101 can acquire light scattering characteristic information from the storage apparatus.

In processing according to the first embodiment to decide an order in which printing materials are superposed, the superposition order of color inks is decided in accordance with only the light scattering intensity. The superposition order is decided to print Y ink having high light scattering intensity on the lowest layer, and M ink having low light scattering intensity on the uppermost layer.

More specifically, as processing (superposition order control processing) which gives priority to vividness, the printer driver 11 (print data generation unit 6) decides an ink superposition order using light scattering characteristic information of each color acquired from the storage apparatus, so as to print by superposing inks in an order in which light scattering hardly occurs. The print data generation unit 6 generates print data such that an ink having the lowest light scattering intensity in one pixel of an image is superposed at the top on a printing medium. This can suppress generation of light scattering of an output image formed on a printing medium.

The print data can also be generated for some or all pixels of an output image in accordance with the application purpose.

Each square shown in FIGS. 4A to 4C represents a region (area) where one ink dot is printed. FIGS. 4A to 4C show a mask pattern in 4×4=16 areas. In actual printing, a combination of 4×4-square mask patterns shown in FIGS. 4A to 4C is repeated in both the vertical and horizontal directions. These mask patterns are stored in the internal memory of the printer 102.

In a printing operation, print data sampled in accordance with the mask pattern of the first pass is printed by the first print scanning By second to sixth print scanning operations, print data sampled in accordance with corresponding mask patterns are printed. The mask patterns of the first to sixth passes for each color are complementary to each other. Thus, all image data are printed by six print scanning operations in a single image region on a printing medium.

As shown in FIGS. 4A to 4C, mask patterns for each color in the first embodiment complete printing by four successive print scanning operations among six print scanning operations. Y ink is printed by the first to fourth passes (FIG. 4A), and is not printed by the fifth and sixth passes. C ink is printed by the second to fifth passes, and is not printed by the first and sixth passes (FIG. 4B). M ink is printed by the third to sixth passes, and is not printed by the first and second passes (FIG. 4C).

The mask patterns of the first to fourth passes in a Y ink pass mask (FIG. 4A) are the same as those of the second to fifth passes in a C ink pass mask (FIG. 4B) and those of the third to sixth passes in an M ink pass mask (FIG. 4C). In other words, the mask pattern of each color is obtained by shifting the start position of a single pattern by one pass.

In all areas, Y ink is completely printed by the mth pass (m is an integer of 1 to 4), C ink is completely printed by the (m+1)th pass, and M ink is completely printed by the (m+2)th pass. Printing can be done in a fixed superposition order of color inks In each pass, the mask patterns of the respective colors are exclusive to each other. Thus, ink dots of a plurality of colors are not printed in a single area by the same pass, and a high-quality fixing result, which is an original purpose of multipass printing, can be obtained.

Figure 5:
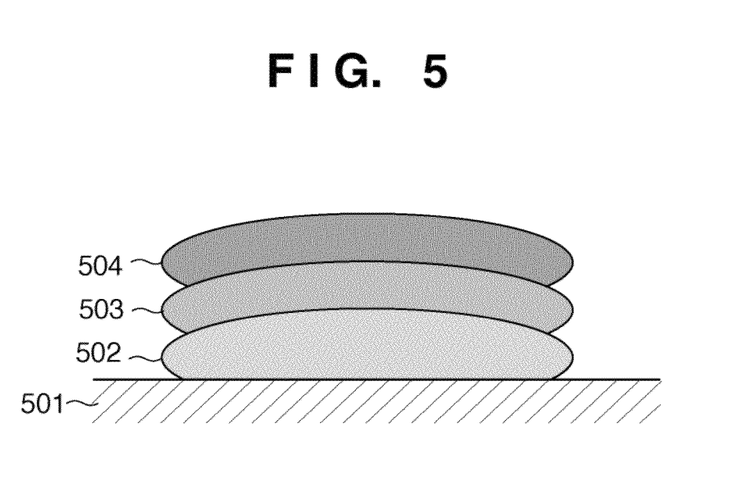
FIG. 5 is a sectional view showing a state in which inks are deposited according to the first embodiment of the present invention.

In the first embodiment, when printing an image in black (so-called composite black) using three, C, M, and Y inks, a Y ink dot 502, C ink dot 503, and M ink dot 504 are stacked from the bottom on a printing medium 501, as shown in FIG. 5.

Light which enters from the surface (upper side in FIG. 5) of a printing medium and is scattered by a Y ink dot to the surface of the printing medium is absorbed in C and M ink dots on the incoming and exit paths. As a result, scattered light is hardly observed from the outside, obtaining a higher-density black image.

When printing is done in an order in which a Y ink dot is superposed at the top, unlike the first embodiment, light which enters from the surface of a printing medium and is scattered by a Y ink dot to the surface of the printing medium is not absorbed in C and M ink dots below the Y ink dot. Thus, strong light scattered by the Y ink dot is observed from the outside, decreasing the density of a black image and reducing the color reproduction range.

Also when printing a high-saturation image with a mixture of two of three, C, M, and Y inks, an ink dot having high light scattering intensity is printed on a lower layer, suppressing scattered light of an unnecessary wavelength band and obtaining a higher-saturation image.

In the first embodiment, the dot print ratio (the number of areas to be printed) is equal between respective passes in four mask patters used to print among mask patterns for each color. However, the print ratios of respective passes may also be different as long as the ink printing order in each area can be controlled. For example, the print ratio of an intermediate pass may also be increased to, for example, reduce the influence of an air flow at the end of the printhead.

The first embodiment has described mask patterns each of 4×4 squares for completing printing by four scanning operations for each color, but the present invention is not limited to this. For example, even pass masks having another form can obtain the same effects as long as the ink superposition order in each area is controlled. Such pass masks also fall within the scope of the present invention. For example, the unit of the mask pattern may be areas in an arbitrary range. Printing in each color may also be done by a smaller or larger number of scanning operations.

The ink superposition order in the first embodiment is merely an example, and another order also falls within the scope of the present invention as long as the superposition order is selected in accordance with the light scattering characteristic (light scattering intensity). The superposition order of color inks is decided not only from the light scattering characteristic, but also together with another characteristic information such as glossiness characteristic information, bronze characteristic information, or fixation of all printing materials used in a printer. This also falls within the scope of the present invention.

Ink colors are not limited to C, M, and Y, and other color inks or a different number of inks may also be used as long as a plurality of colors are used. For example, when a light color ink is used, a relatively large amount of ink is used to reproduce even a low-density color. The ratio at which an underlying ink having high light scattering intensity is covered increases, so the present invention is preferably applied.

When a spot color ink is used, it is printed at the top because the spot color ink can efficiently absorb light scattered by a complementary color ink, thereby more effectively practicing the present invention.

Light scattering characteristic information may also be acquired from, for example, a print result of printing single-color solid patch images with all inks used in the printer 102 while the host apparatus 101 controls the printer 102. That is, the host apparatus 101 controls a measurement device (not shown) connected to it, and the measurement device measures the light scattering characteristics of single-color solid patch images in all colors printed on a printing medium, thereby acquiring light scattering characteristic information.

Light scattering characteristic information may also be that of a liquid printing material or a diluted liquid of the printing material.

Light scattering characteristic information may also be estimated from the composition of a printing material.

The printing material may also include a combination of two or more types of printing materials having the same hue and different densities. In this case, a printing material having low density in a combination of two or more types of printing materials having the same hue and different densities is preferably printed on a relatively upper layer.

A plurality of types of printing materials include at least one type of printing material of a spot color having a hue between arbitrary two of printing materials of cyan, magenta, and yellow basic colors. In this case, the printing material of the spot color is preferably printed on a layer above the printing materials of the basic colors.

As described above, the first embodiment can widen the color reproduction range and improve image quality by controlling the superposition order of color inks in accordance with the light scattering characteristics of the inks.

It can be controlled to superpose a plurality of types of printing materials such that a printing material having low light scattering intensity is superposed on an upper layer. The first embodiment can, therefore, suppress scattering of light in an unnecessary wavelength band to the outside, and widen the color reproduction range of high-saturation, high-density portions.

<Second Embodiment>

A printer according to the second embodiment adopts a total of 11 colors: cyan C, magenta M, yellow Y, black K, light colors including photo cyan Pc, photo magenta Pm, gray Gy, and photo gray Pgy, and spot colors including red R, green G, and blue B. A printing system according to the second embodiment is identical to that in the first embodiment. A color separation processing unit 3 is extended to generate data corresponding to the 11 color inks As described above, multipass printing has an effect of distributing various noise components, and an effect of obtaining a high-quality image even with a combination of an ink and printing medium having low absorption speed. These effects are enhanced as the number of passes increases. However, the print speed decreases in proportion to the number of passes.

When pass masks described in the first embodiment are applied, the number of actual passes for each color is four, but six passes are required as the total number of print scanning operations, decreasing the print speed regardless of the effects of multipass printing. As the number of inks increases, the total number of necessary print scanning operations further increases. When a printhead capable of discharging 11 color inks is mounted, like the second embodiment, a total of 14 print scanning operations are necessary in the method of the first embodiment.

From this, the second embodiment will explain an arrangement which controls the ink superposition order by changing the print ratio of each color ink dot on each pass without increasing the total number of passes.

The 11 color inks are classified into three groups in accordance with the light scattering characteristic. Group 1 is a group of inks having high light scattering characteristic, and includes C, M, and Y inks Group 3 is a group of inks having low light scattering characteristic, and includes Bk, R, G, and B inks Group 2 is a group of inks having intermediate light scattering characteristic, and includes Pc, Pm, Gy, and Lgy inks FIG. 6 is a table showing the print ratio of each pass for each color group in a pass mask used in the second embodiment of the present invention.

Figure 6:
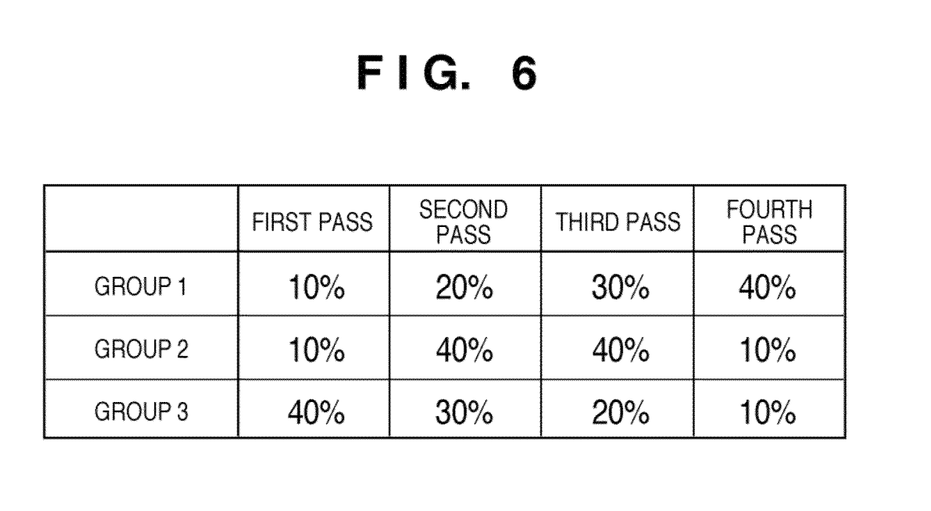
FIG. 6 is a table showing the print ratio of each pass for each color group in a pass mask used in the second embodiment of the present invention.

The mask patterns actually used are created to be exclusive between passes in accordance with print ratios shown in FIG. 6, and are stored in a printer 102.

The print ratio of each color ink for each pass is decided in accordance with the light scattering characteristic of the color ink. The print ratio of a relatively early pass is set high for a pass mask used for group 1 having high light scattering characteristic. The print ratio of a relatively late pass is set high for a pass mask used for group 3 having low light scattering characteristic. The print ratio of an intermediate pass is set high for a pass mask used for group 2 having intermediate light scattering characteristic.

In this case, the ink superposition order cannot be the same between all pixels. However, inks having high light scattering characteristic can be printed mainly on lower layers, and inks having low light scattering characteristic can be printed mainly on upper layers as a whole.

In the second embodiment, printing is completed by four print scanning operations for each color. Since printing starts and ends simultaneously for the respective colors, printing can be completed by a total of four scanning operations. In this manner, the superposition order of color inks can be controlled without increasing the total number of passes.

In the second embodiment, the print ratios of respective passes for group 1 and 3 monotonically increase or decrease, but the change of the print ratio is not limited to this as long as the superposition order of color inks can be controlled. For example, the print ratios of passes other than the first and final passes may also be maximized to, for example, reduce the influence of an air flow at the end of the printhead.

The superposition order of printing materials may also be decided in accordance with the light scattering characteristic for only a portion having a color saturation higher than a predetermined one in each hue and brightness in a color gamut reproducible by the printer 102.

If a slight decrease in print speed is permitted and priority is given to higher image quality, printing with a printing material to be printed on a relatively lower layer preferably starts in main scanning executed relatively early among N main scanning operations in a single region of an image. Printing with a printing material printed on a relatively lower layer is preferably completed in main scanning executed relatively early among N main scanning operations in a single region of an image.

As described above, the second embodiment can widen the color reproduction range and increase the print speed by changing the print ratio of the pass mask of each color for each pass in accordance with the light scattering characteristic.

<Third Embodiment>

The third embodiment employs a printing system shown in FIG. 1, similar to the first embodiment. Also, the third embodiment uses the same inks as those in the first embodiment.

An inkjet printer used in the third embodiment forms an image by performing main scanning to drive a printhead on a stationary printing medium, and sub-scanning to drive a printing medium in a direction perpendicular to the main scanning direction every time one main scanning ends. The inkjet printer also performs so-called bi-directional printing to discharge ink in main scanning in both forward and return passes. In the following description, each of forward and return passes is handled as one main scanning FIG. 7 is an exploded perspective view showing a printhead used in the third embodiment of the present invention.

Figure 7:
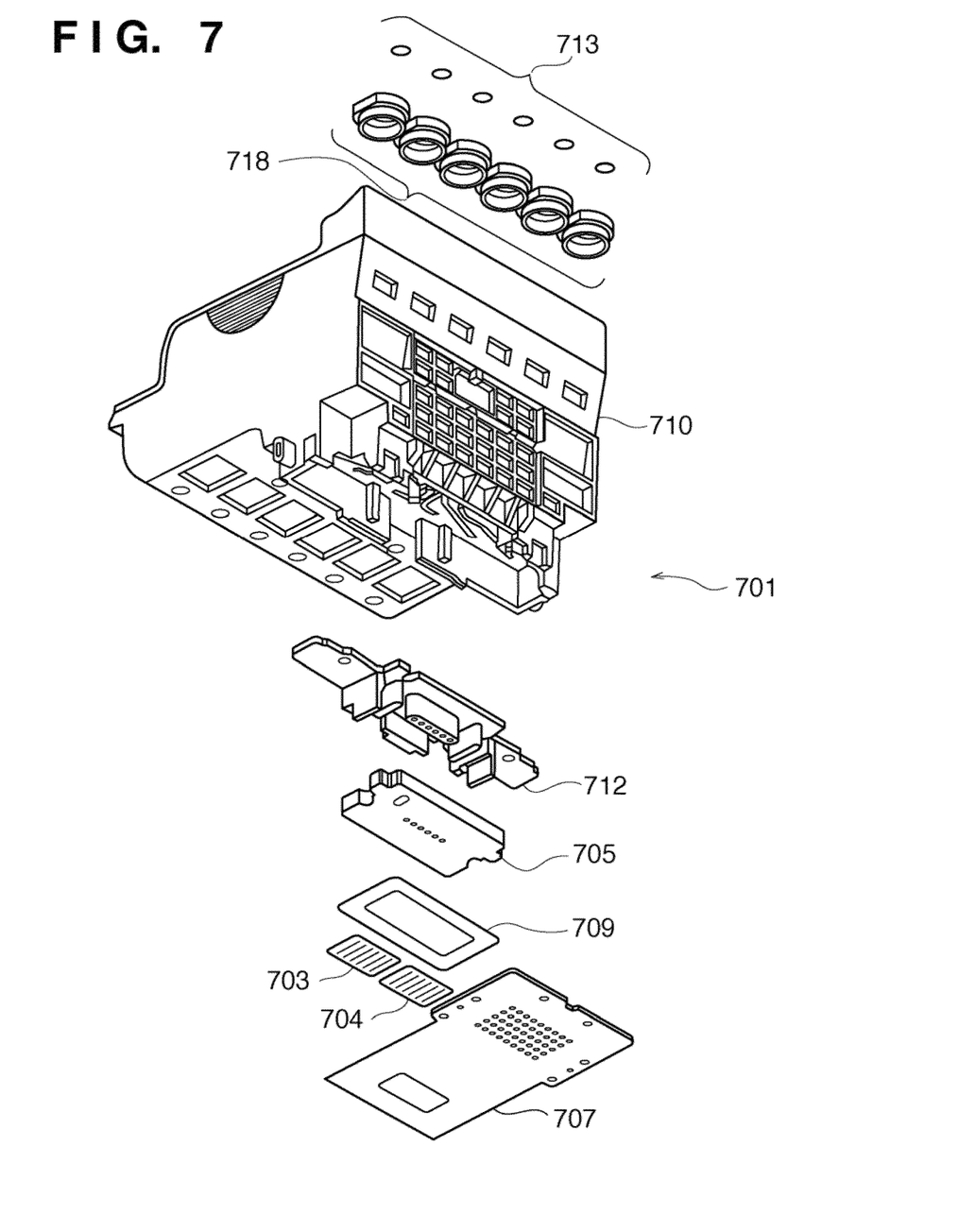
FIG. 7 is an exploded perspective view showing a printhead used in the third embodiment of the present invention.

In FIG. 7, a head cartridge 701 of the printhead includes a first printing element substrate 703, second printing element substrate 704, first plate 705, second plate 709, and printed circuit board 707. The head cartridge 701 further includes a tank holder 710, a channel forming member 712, filters 713, and sealing rubber members 714.

The first printing element substrate 703 and second printing element substrate 704 are Si substrates. A plurality of printing elements (nozzles) for discharging ink are formed by photolithography on one surface of each Si substrate. An electric wiring line of Al or the like for supplying power to each printing element is formed by a film forming technique. A plurality of ink channels corresponding to respective printing elements are also formed by photolithography Ink supply ports for supplying ink to a plurality of ink channels are formed to be open in the lower surfaces of the first printing element substrate 703 and second printing element substrate 704.

Figure 8:
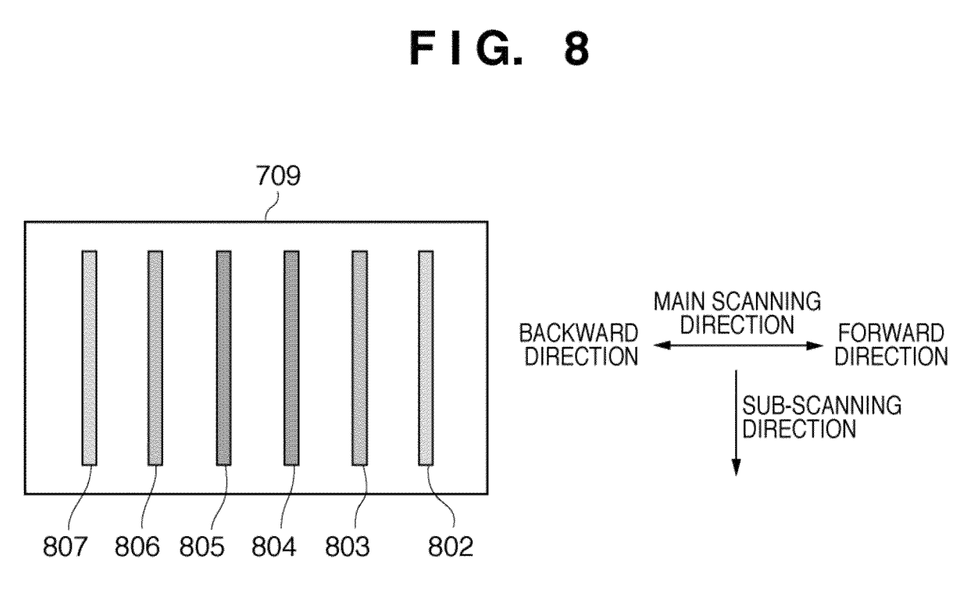
FIG. 8 is a plan view showing a nozzle arrangement on a printing element substrate according to the third embodiment of the present invention.

FIG. 8 is a plan view showing a nozzle arrangement on the printing element substrate according to the third embodiment of the present invention.

On the plate 709, nozzle arrays in which nozzles for discharging an ink of the same color are aligned in a direction perpendicular to the main scanning direction are arranged at two portions for each color. Nozzle arrays 802 and 807 discharge Y ink, nozzle arrays 803 and 806 discharge C ink, and nozzle arrays 804 and 805 discharge M ink. The three nozzle arrays 802 to 804 are driven in forward main scanning, and the three nozzle arrays 805 to 807 are driven in backward main scanning That is, in both forward and return passes, Y ink nozzles discharge ink on the front side in the traveling direction of main scanning, and M ink nozzles discharge ink on the rear side in the traveling direction.

That is, some or all of the nozzle arrays of the printhead are preferably aligned in order in the traveling direction of main scanning of the printhead in accordance with an order in which printing materials discharged from the nozzle arrays are superposed.

Main scanning includes forward main scanning of driving at least either the printhead or a printing medium in a predetermined direction, and backward main scanning of driving at least either the printhead or a printing medium in a direction opposite to that of forward main scanning At least some of the nozzle arrays of the printhead are arranged separately as forward pass nozzle arrays in which the nozzle arrays are aligned in order in the traveling direction of forward main scanning, and return pass nozzle arrays in which the nozzle arrays are aligned in order in the traveling direction of backward main scanning With this arrangement, even when inks of a plurality of colors are discharged to a single pixel in one main scanning, Y ink is discharged first and M ink is discharged last, thereby controlling the landing order of inks on a printing medium. The superposition order of color inks can be controlled to widen the color reproduction range without increasing the number of passes.

In the third embodiment, only the ink superposition order is controlled in accordance with the arrangement order of nozzle arrays. However, a combination of this control method and another one also falls within the scope of the present invention. For example, a combination of the control method in the third embodiment and superposition order control premised on multipass printing as described in the first or second embodiment also falls within the scope of the present invention.

The third embodiment can control the superposition order of color inks without performing multipass printing.

As described above, the third embodiment can widen the color reproduction range and increase the print speed by deciding the arrangement order of ink nozzles on the printhead in accordance with the light scattering characteristic.

The present invention can be implemented in a variety of forms. For example, the present invention can be implemented in the forms of a printing method and printing apparatus, a printing control method and printing control apparatus, and software for implementing the functions of these methods and apparatuses. As other forms, the present invention can be implemented in the forms of a recording medium which records the software, and data signals which include the software and are embodied in a carrier.

In particular, the printing method suffices to stack a plurality of types of printing materials on the surface of a printing medium, and various printing methods accompanied by plate making for each printing material are also available. The printing method may also be an image printing method accompanied by no plate making, such as an inkjet method, electrophotographic method, thermal transfer method, or dot impact method. An inkjet printer may also be a serial printer in which the printhead scans the printing region in longitudinal and lateral directions, or a line head printer in which nozzles are arranged along the entire width of a printing region, and the printhead scans in only one direction.

The present invention can provide an information processing method, apparatus, and program capable of suppressing scattering of light in an unnecessary wavelength band to the outside, and widening the color reproduction range of high-saturation, high-density portions.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or script data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information processing apparatus for generating print data for a printing apparatus that forms an image on a printing medium with a plurality of types of printing materials, the apparatus comprising:
   an acquisition unit configured to acquire light scattering characteristic information representing a light scattering characteristic of each of the plurality of types of printing materials;
   a decision unit configured to decide an order of superposing the plurality of types of printing materials in a predetermined region of the image in accordance with the acquired light scattering characteristic information such that a printing material having a relatively high light scattering characteristic is printed on a relatively lower layer on the printing medium; and
   a generation unit configured to generate the print data to form the image on the printing medium using the plurality of types of printing materials in accordance with the decided order.

2. The apparatus according to claim 1, wherein the decision unit classifies the plurality of types of printing materials into a plurality of groups in accordance with the light scattering characteristics of the plurality of types of printing materials, and decides the order in which the printing materials are superposed for the respective groups to form an image on the printing medium.

3. An information processing system for generating print data for a printing apparatus that forms an image on a printing medium with a plurality of types of printing materials, the system comprising:
   an acquisition unit configured to acquire light scattering characteristic information representing a light scattering characteristic of each of the plurality of types of printing materials;
   a decision unit configured to decide an order of superposing the plurality of types of printing materials in a predetermined region of the image in accordance with the acquired light scattering characteristic information such that a printing material having a relatively high light scattering characteristic is printed on a relatively lower layer on the printing medium; and
   a generation unit configured to generate the print data to form the image on the printing medium using the plurality of types of printing materials in accordance with the decided order.

4. An information processing method of generating print data for a printing system which forms an image on a printing medium with a plurality of types of printing materials and which comprises an acquisition unit, the method comprising:
   an acquisition step of using the acquisition unit to acquire light scattering characteristic information representing a light scattering characteristic of each of the plurality of types of printing materials;
   a decision step of deciding an order of superposing the plurality of types of printing materials in a predetermined region of the image in accordance with the acquired light scattering characteristic information such that a printing material having a relatively high light scattering characteristic is printed on a relatively lower layer on the printing medium; and
   a generation step of generating the print data to form the image on the printing medium using the plurality of types of printing materials in accordance with the decided order.

5. A non-transitory computer-readable medium for storing a program that causes a computer to execute an information processing method of generating print data for a printing system that forms an image on a printing medium with a plurality of types of printing materials and that comprises an acquisition unit, the method comprising:
   an acquisition step of using the acquisition unit to acquire light scattering characteristic information representing a light scattering characteristic of each of the plurality of types of printing materials;
   a decision step of deciding an order of superposing the plurality of types of printing materials in a predetermined region of the image in accordance with the acquired light scattering characteristic information such that a printing material having a relatively high light scattering characteristic is printed on a relatively lower layer on the printing medium; and
   a generation step of generating the print data to form the image on the printing medium using the plurality of types of printing materials in accordance with the decided order.

6. An information processing apparatus for generating print data to a printing apparatus which forms an image on a printing medium with a plurality of types of printing materials, the apparatus comprising:
   an acquisition unit configured to acquire light scattering characteristic information representing a light scattering characteristic of each of the plurality of types of printing materials;
   a conversion unit configured to convert input color data indicated by input image data into printing material data corresponding to the plurality of types of printing materials; and
   a generation unit configured to generate print data for forming an image on the printing medium by superposing the plurality of types of printing materials in at least some pixels of an output image in an order complying with intensities of the acquired light scattering characteristics of the plurality of types of printing materials on the basis of the printing material data.

7. An information processing method of generating print data for a printing system which forms an image on a printing medium with a plurality of types of printing materials and which comprises an acquisition unit, the method comprising:
   an acquisition step of using the acquisition unit to acquire light scattering characteristic information representing a light scattering characteristic of each of the plurality of types of printing materials;
   a conversion step of converting input color data indicated by input image data into printing material data corresponding to the plurality of types of printing materials; and
   a generation step of generating print data for forming an image on the printing medium by superposing the plurality of types of printing materials in at least some pixels of an output image in an order complying with intensities of the acquired light scattering characteristics of the plurality of types of printing materials on the basis of the printing material data.

8. A non-transitory computer-readable medium for storing a program which causes a computer to execute information processing method of generating print data for a printing system which forms an image on a printing medium with a plurality of types of printing materials and which comprises an acquisition unit, the method comprising:
- an acquisition step of using the acquisition unit to acquire light scattering characteristic information representing a light scattering characteristic of each of the plurality of types of printing materials;
- a conversion step of converting input color data indicated by input image data into printing material data corresponding to the plurality of types of printing materials; and
- a generation step of generating print data for forming an image on the printing medium by superposing the plurality of types of printing materials in at least some pixels of an output image in an order complying with intensities of the acquired light scattering characteristics of the plurality of types of printing materials on the basis of the printing material data.

* * * * *